United States Patent [19]

Heni et al.

[11] 4,233,868
[45] Nov. 18, 1980

[54] APPARATUS FOR MOVING LIGHTWEIGHT ARTICLES

[75] Inventors: Wolfgang Heni, Schlangenbad-Georgenborn; Peter Wolf, Wiesbaden-Biebrich, both of Fed. Rep. of Germany

[73] Assignee: Bellaplast GmbH, Wiesbaden, Fed. Rep. of Germany

[21] Appl. No.: 47,636

[22] Filed: Jun. 11, 1979

[30] Foreign Application Priority Data

Feb. 14, 1979 [DE] Fed. Rep. of Germany ....... 2905619

[51] Int. Cl.³ .......................... B21D 45/02; B26F 1/38
[52] U.S. Cl. ......................................... 83/126; 83/149; 83/152; 83/155.1
[58] Field of Search .............. 83/126, 149, 152, 155.1, 83/103, 97, 150

[56] References Cited

U.S. PATENT DOCUMENTS

| | | |
|---|---|---|
| 3,347,011 | 10/1967 | Lovas et al. ........................ 83/126 X |
| 3,735,654 | 5/1973 | Jurasek ............................... 83/152 X |

*Primary Examiner*—Frank T. Yost
*Attorney, Agent, or Firm*—LeBlanc, Nolan, Shur & Nies

[57] ABSTRACT

Apparatus for moving lightweight articles, for instance thermoplastics cups, in which the articles are moved from one location by ejector pins which push the articles onto a conveyor for transfer to another location. The articles are held in a desired orientation as they are moved by the pins. Ideally, a passage extends through each pin to hold the articles thereto by vacuum which alternates with air pressure in the passage to force articles from the pin onto the conveyor when the pin is closest to the conveyor. The pins move along guide passages which assist in maintaining articles properly orientated and stabilizing plates are preferred adjacent the conveyor to stabilize articles during transfer onto the conveyor. The apparatus is useful in removing thermoformed cups from sheet and for this purpose a cutting device may cooperate with each ejector pin for cutting and then transferring cups.

24 Claims, 14 Drawing Figures

APPARATUS FOR MOVING LIGHTWEIGHT ARTICLES

This invention relates to apparatus for moving lightweight articles.

Apparatus is known for moving lightweight articles such as containers from one location to another. This known apparatus involves the use of ejection pins which push the containers from the one location, in which they may have been formed with rim flanges. The ejection pins deposit the containers upon a suction device upon which they are then transferred to the second location. Delivery of the containers depends upon the speed of operation of the suction device which moves to and fro between the stations. Delivery of the containers to the second station is, therefore, an intermittent operation with delivery movements alternating with return movements of the suction device.

Furthermore, the containers are placed upon the suction device by their closed ends. This operation is difficult to accomplish satisfactorily while ensuring that the suction device holds the containers and the procedure requires careful handling and is time consuming.

The present invention provides apparatus which overcomes the above problems in that use of an intermittently transferring suction device is avoided.

Accordingly, the present invention provides apparatus for moving lightweight articles from a first location to a second location comprising:

(a) an endless conveyor moveable continuously past the first location and towards and through the second location, and having an article carrying surface directed towards the first location and air flow passages from the article carrying surface to the side of the conveyor remote from the carrying surface;

(b) air pressure reducing means disposed at said remote side of the conveyor and operable to draw air through the conveyor and hold articles against the carrying surface by suction effect as the conveyor moves towards the second location;

(c) at least one article ejector pin moveable on a working stroke through the first location normal to and towards the carrying surface to push successive articles on successive working strokes from the first location towards the carrying surface, and then moveable on a return stroke preparatory to a succeeding working stroke;

(d) movement of the pin on its working stroke being limited to define a gap between the conveyor and the pin sufficiently small to enable transfer of an article to the carrying surface with the distance across the gap being greater than the maximum dimension of the article in the direction of pin movement; and (e) article orientation control means operable between the first location and the carrying surface to hold an article in a desired position of orientation as it is pushed towards the carrying surface by the ejector pin.

As used in the last preceding paragraph and throughout the remainder of this specification, the term "lightweight articles" refers to articles of such weight, size and shape as to be controllable in position by differential pressure conditions, for instance, by being capable of being held to the carrying surface by the suction effect created by the air pressure reducing means. Within this definition of lightweight articles are included cups or other containers of similar or smaller size and made by thermoforming from thermoplastic materials.

As a result of the continuous motion of the conveyor, immediately an article is deposited upon the carrying surface, it is carried away and towards the second location thereby presenting a succeeding portion of the carrying surface for deposition of another article by succeeding movement of the ejector pin. The transfer of articles to the conveyor occurs in such a manner that they are immediately held upon the carrying surface by suction effect and commence their movement on the carrying surface to the second location. This is because no contact is maintained with the ejector pin, which could impede movement along the carrying surface, upon the articles engaging the carrying surface as differential pressure conditions are responsible for moving each article from the ejector pin before it engages the carrying surface. Thus, momentarily the articles are out of physical contact with both the ejector pin and with the carrying surface but the suction effect created through the carrying surface holds the articles in their required positions during this time. Articles may be transferred successfully even when the conveyor is travelling at a high speed to keep up with demand for a high rate of supply of articles at the second location.

In a preferred arrangement, the orientation control means is operable to hold an article to the ejector pin during the working stroke and is operable to release the article at the end of the working stroke. To this end, conveniently the ejector pin has an annular end face for engaging a surface of an article during a working stroke and has passage defining means with an axially directed orifice disposed within the annular end face. The passage defining means is interconnectable with air pressure reducing means to hold the article to the pin by suction during the working stroke. Desirably, the passage defining means is also connectable to a source of compressed air at the end of the working stroke to urge the article away from the ejector pin and towards the carrying surface. To effect alternate operation of the air pressure reducing means or the compressed air, valve means is incorporated which is operated by the position of the ejector pin.

One preferred example of the invention includes as part of the orientation control means, an article guide extending from the first location towards the carrying surface and defining an article guide passage, the guide terminating at a position spaced from the carrying surface to avoid interference with articles as they are moved along the carrying surface. The orientation control means advantageously should include stabilizing plates extending from the article guide towards the carrying surface and extending one along each side of the feed path for articles held upon the carrying surface of the conveyor. The ejector pin moves along the guide passage on its working and return strokes. The stabilizing plates, which prevent tilting sideways of the articles when they are first located upon the carrying surface and commence their movement along the conveyor, may be tapered from the article guide towards the carrying surface to provide divergent opposing stabilizing surfaces for stabilizing articles in the form of tapered containers as these articles move out of the guide passage and locate larger diameter ends onto the carrying surface. As the containers start to move along the conveyor, they are prevented from tilting sideways by the close proximity of the stabilizing surfaces. Parts of the stabilizing surfaces in axial alignment with the guide passage are shaped to form axial extensions of the guide passage. This provides improved stabilization to the axial motion of containers along the guide passage and onto the carrying surface. Above all, the jolt, particularly during high speed operation, caused between the carrying surface and a container upon engagement therebetween is absorbed without the container moving out of its designated feed path on the carrying surface.

For moving articles in the form of containers, the apparatus comprises, in the first location, a severing device including a pair of coacting cutting tools. One tool is a female cutting tool and the other a male cutting tool moveable on a cutting towards the carrying surface and through the female cutting tool to sever containers at their rims from a length of material with which they are integral. The male tool is annular to move along and surround, on its cutting stroke, the side wall of a container located in the first location with its open end directed towards the carrying surface. The severing device may be a multiple cutting tool with a plurality of pairs of coacting cutting tools with the pairs being disposed spaced-apart and side-by-side to form rectilinear rows with each row extending in the direction of movement of the conveyor and the rows being spaced laterally of the direction of conveyor movement. The pairs of tools may be disposed in staggered relationship from one row to another.

An endless conveyor included in the apparatus of the invention may be of many designs. For instance, it could take the form of a continuously rotatable suction wheel having an outer peripheral surface as its carrying surface. In one preferred arrangement, however, the conveyor is a flexible endless member which is rendered air permeable. Alternatively, it comprises two or more side-by-side conveyor belts which define gaps between them for passage of air.

The air pressure reducing means is conveniently a box structure having perforate sides supporting the conveyor from the first to second locations, the interior of the box structure being connectable to a source of reduced air pressure.

The length of the ejector pin is preferably adjustable. This makes it possible to achieve optimal stabilizing and guidance conditions upon articles as they are moved from the first location to the carrying surface. It is, however, possible to make the distance travelled by the fingers adjustable.

It is also within the inventive scope to provide means for adjusting the distance between the conveyor and the first location. This adjustment makes it possible to use the apparatus for different sizes of articles but also assists in obtaining the most suitable position of the conveyor for controlling movement of articles from the first location to the carrying surface. This adjusting means may comprise a frame which carries the conveyor, and a guiding sub-frame upon which the frame is mounted for movement towards and away from the first location. It is preferable to provide stop elements to adjust the minimum distance between the conveyor and the first location and which would ensure return of the conveyor to exactly the same operating position after its removal therefrom.

In cases where the conveyor may be moved, it is desirable to locate a disposal unit for articles beneath the conveyor for the purpose of catching any articles moved towards the conveyor and released by the ejector pin when the conveyor is not in its operating position. This makes it possible, upon initial start-up of the apparatus, to adjust the position of the conveyor to find its most efficient operating position while ensuring that any articles not being transferred to the carrying surface are collected together for disposal purposes. Also, if defects arise which necessitate removal of the conveyor for a short time, it is more convenient to maintain the operation of preceding processes up to the first station and for the continued operation of the ejector pin and catching of articles in the disposal unit than to terminate all these preceding processes.

The invention also includes apparatus for moving lightweight articles in the form of containers from a first location to a second location comprising:

(a) an endless conveyor moveable continuously past the first location, and having an article carrying surface directed towards the first location and air flow passages from the article carrying surface to the side of the conveyor remote from the carrying surface;

(b) air pressure reducing means disposed at said remote side of the conveyor and operable to draw air through the conveyor and hold containers against the carrying surface by suction effect as the conveyor moves towards the second location;

(c) a severing device disposed in the first location, said device comprising a pair of coacting cutting tools, one of said tools being a female cutting tool having an annular cutting edge and the other tool being a male cutting tool moveable on a cutting stroke towards the carrying surface and through the female cutting tool to sever containers at their rims from a length of material with which they are integral, the male cutting tool being annular so as to move along and surround the side wall of a container located in the first location as the male cutting tool moves towards the female cutting tool on its cutting stroke;

(d) an article guide extending from the female cutting tool towards the carrying surface and defining an article guide passage for guiding a container as it is moved from the first location to the carrying surface; and (e) an article ejector pin moveable on a working stroke towards the carrying surface while trailing the male cutting tool moving on its cutting stroke, the ejector pin continuing its working stroke after the completion of the cutting stroke to pass through the annular male cutting tool and engage a surface of a closed end of a severed container and transfer the container to the carrying surface, the ejector pin then being moveable on a return stroke preparatory to a succeeding working stroke.

An embodiment of the invention will now be described, by way of example, with reference to the accompanying drawings, in which.

Figure 1:
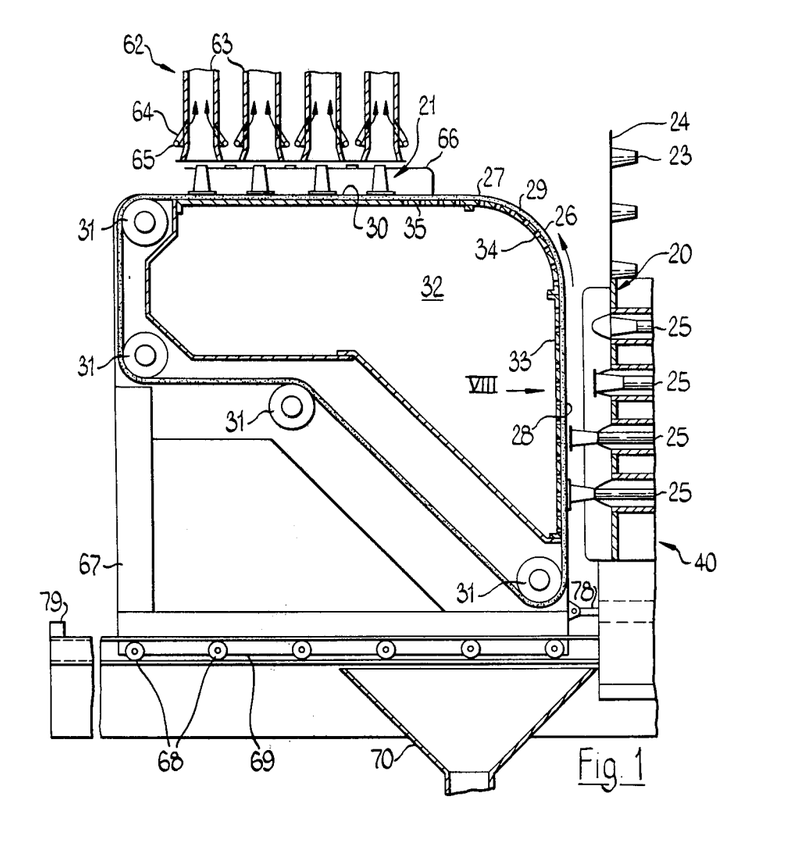
FIG. 1 is a side elevational view, in cross-section, of an apparatus for moving drinking containers.

In the embodiment, as is shown generally in FIG. 1, apparatus is provided for transferring lightweight articles, in the form of thermoformed plastic drinking containers, from a first location 20 to a second location 21. The apparatus comprises a severing device 22 in the first location and in which containers 23 are severed from a sheet 24 of thermoplastic material in which they are integrally formed, a plurality of ejector pins 25 for removing the containers and a conveyor 26 along the carrying surface 27 of which the containers are moved to the second location 21.

For convenience, the following description deals firstly with the conveyor 26 and with a device for removing the containers from the conveyor before dealing with the detail of operation of the severing device and ejector pins.

The conveyor is a single endless flexible conveyor belt which is of air permeable construction in that it is formed with a certain inherent permeability or is intentionally provided with a plurality of spaced-apart holes. As the conveyor passes up a vertical flight 28, it passes the first location 20. From flight 28 it passes around an arcuate portion 29 to a horizontal flight 30 which carries it to, and beyond, the second location 21. It then returns to flight 28 by passing around four pulley wheels 31, one of which is driven for providing the conveyor with continuous motion.

Air pressure reducing means is provided for drawing air through the conveyor to hold containers 23 to the carrying surface 27 of the conveyor as the containers are carried from the first station 20 to the second station 21. This air pressure reducing means comprises a box structure 32 forming a suction chamber interconnected by air passages (not shown) to a source of reduced air pressure (not shown). As may be seen from FIG. 1, the structure 32 is confined within the path of the endless conveyor. The structure is airtight except for sides 33, 34 and 35 which underlie, respectively, flight 27, arcuate portion 29, and flight 30 of the conveyor. Sides 33 and 34 and a portion of side 35 which lies adjacent side 34 are perforate. The reason for non-perforation of the rest of side 35 is discussed below.

The perforate sides 33, 34 and 35 should be sufficiently rigid to prevent any deviation in movement of the conveyor in the direction through its depth or thickness. This is particularly the case where the conveyor passes the first location 20. In this regard, each of the sides provides a support for the conveyor and sides 33 and 35 may be formed either as a perforate metal grid as shown for side 33 in FIG. 7 or as a woven wire mesh as shown for side 35 in FIG. 2, and comprising woven metal strands 36. Struts may be used to stiffen the mesh.

In order to reduce frictional grip of the conveyor on the side 34 of the structure as the conveyor passes through its arcuate portion 29, the side 34 comprises a plurality of conveyor supporting rolls 37 (FIG. 3) rotatably mounted freely in the structure. These rolls project from the structure 32 beyond metal strips 38 which lie between the rolls and define gaps 39 for the flow of air through the conveyor and into the box structure.

In the first location (FIG. 1), the severing device 22 and the ejector pins form part of a single operational unit 40 which extends towards the conveyor from the location 20. This unit comprises a main plate 41 (FIG. 7) lying parallel but spaced from the flight 28 a distance sufficient to give clearance to containers moving up the flight. A plurality of article guides 42 in the form of cylindrical tubes, each has one end welded or otherwise secured in apertures in the plate with the guides extending away from the conveyor as shown in FIGS. 4 to 7. Each guide 42 defines a cylindrical guide passage 43 for containers and integrally provides at its other end, a female cutting tool having an annular cutting edge 44 formed at the end of the guide passage. This cutting edge lies in the first location 20. Each female cutting tool forms one of a pair of coacting cutting tools which also comprises a male cutting tool 45 in the form of a short cylinder and having an annular cutting edge 46 to cooperate with the cutting edge 44.

The severing device is thus a multiple cutting tool with a plurality of pairs of coacting cutting tools associated one pair with each article guide 42.

Figure 2:
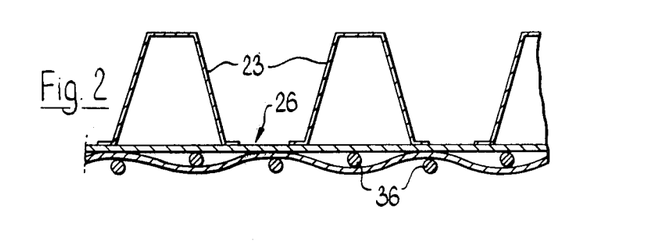
FIG. 2 is a cross-sectional side elevational view of part of the apparatus of FIG. 1 and on a larger scale.

The guides 42 and thus the cutting tools are spaced apart side-by-side to form rectilinear rows 47 (FIG. 8) with each row extending in the direction of movement of the flight 28, i.e. vertically. The rows 47 are spaced apart laterally of the direction of movement of the conveyor flight as shown in FIG. 2, with the guides 42 and tools being in staggered relationship from one row to another.

The male cutting tools 45 are securely mounted upon a mounting plate 48 which is reciprocable in normal fashion to move the tools 45 from a retracted position (FIG. 4), on a cutting stroke through the female cutting edges 44 and then on a return stroke. As may be seen from FIGS. 5, 6 and 7, the tools 45 slideably move along the guide passages 43 on the completion of their cutting strokes.

Each male tool 45 is also annular and has a frustoconical inner surface 49 shaped to move along and closely surround the side wall of a container during a cutting stroke. The inner surface 49 combines with the tool end surface 50 to push a container partly along the guide passage 43 during the completion of a cutting stroke while maintaining the desired orientation of the container as will be described.

Figure 6:
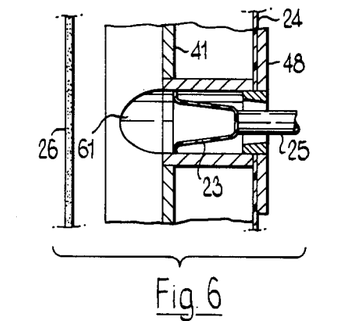
Figure 7:
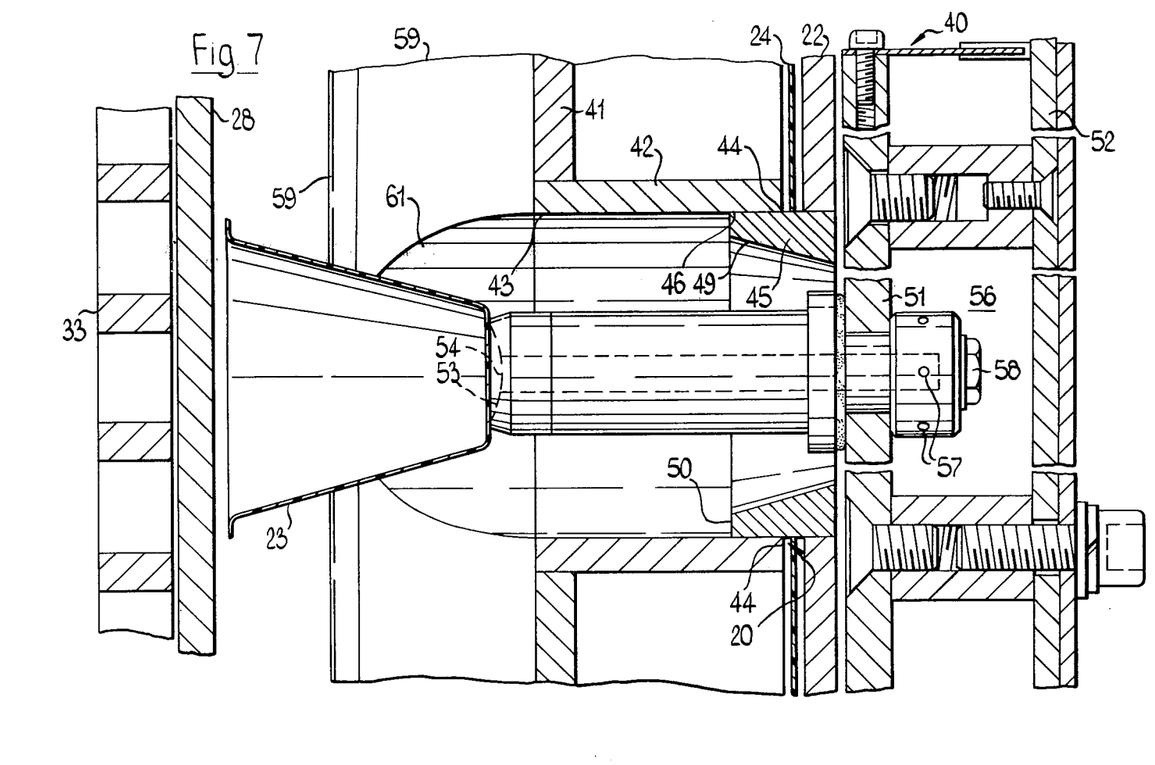
FIG. 7 is a view of the unit similar to FIGS. 4, 5 and 6 but on a larger scale to show details of construction.

The ejector pins, which are provided one for each pair of coacting tools are secured to a stripper plate 51 with each pin coaxial with its associated tool 45 and article guide 42. The stripper plate 51 is part of a box carrier 52 which is driveable on working and return strokes of the ejector pins towards and away from flight 28. On the working stroke, the movement of carrier 52 carries the ejector pins towards the first location (i.e. the plane of the cutting edges 44) while trailing the male cutting tool on its cutting stroke (FIG. 5), the ejector pins then continuing on their working strokes to move the pins through the male cutting tools 45 and towards the flight 28 (FIGS. 1, 6 and 7).

The ejector pins are each provided with an annular end face 53 of concave curvature and having a coaxial orifice 54 opening at the end face. The orifice 54, end face 53, and a passage defining means in the form of the surface of an internal passage 55 of each ejector pin, forms part of article orientation control means which also includes article guides 42 and the surfces 49 and 50 of the male tools 45. The interior 56 of the structure 52 is interconnected through metering passages 57 at an end of each ejector pin projecting into interior 56, with the axial passage 55. The interior 56 is also connected during the working stroke with an air pressure reducing means (not shown) to reduce air pressure in the passages 55 and at the end faces 53 to hold containers to the end faces. At the end of the working stroke, the interior 56 is connected by valve means (not shown) to a source of compresssed air (not shown) to apply pressure at end faces 53 and force containers away from the ejector pin. A calibrating bolt 58 is provided at the end of each ejector pin for controlling the effective cross-sectional area of the metering passages. Preferably the length of each ejector pin is adjustable (not shown) or the stroke of the carrier 52 is adjustable to vary the distance of the ends of the pins from the conveyor at the end of the working stroke.

The article orientation control means also comprises a plurality of stabilizing plates 59 extending from the article guides 42 towards the conveyor (FIGS. 8, 9, 10, 11). The stabilizing plates are disposed between rows 47 of tools and article guides so as to extend along each side of each feed path for containers upon the carrying surface of the conveyor. Each stabilizing plate is mounted upon the main plate 41 and is tapered (FIG. 9) as it extends towards the carrying surface of the conveyor so that adjacent plates 49 have stabilizing surfaces 60 which diverge as they extend towards the conveyor. These surfaces 60 are provided to prevent sideways tilting of containers when they are initially located upon the carrying surface of the conveyor. The close proximity of the surfaces 60 ensures the containers are located upon feed paths on the conveyor.

Because of the base width of the stabilizing plates 59, it is necessary to cut away the plates to allow the containers to issue from the guides 42. To this end, each stabilizing surface is cut away to form a part cylindrical surface 61 in axial alignment with each guide passage 43, the surfaces 61 thus forming axial extensions of the passages 43 beyond the main frame 41.

Figure 8:
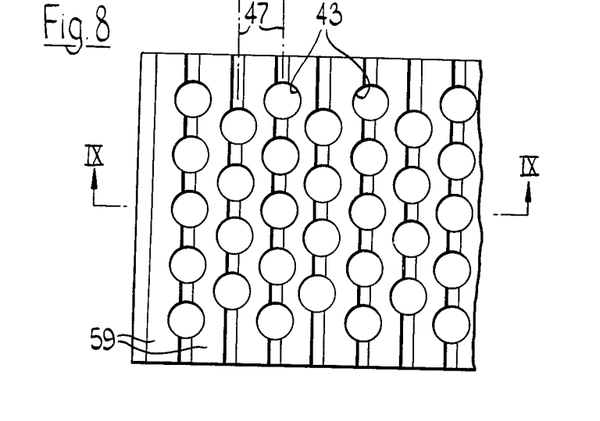
FIG. 8 is a front view of part of the unit of FIGS. 4, 5 and 6 taken in the direction of arrow VIII in FIG. 1.
Figure 9:
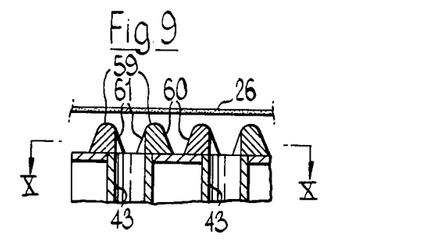
FIG. 9 is a cross-sectional view of the unit taken along line 'IX—IX' in FIG. 8.
Figure 10:
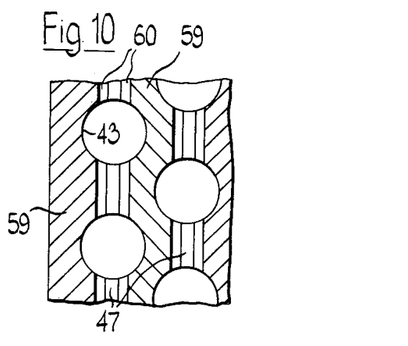
FIG. 10 is a cross-sectional view of the unit taken along line 'X—X' in FIG. 9.
Figure 11:
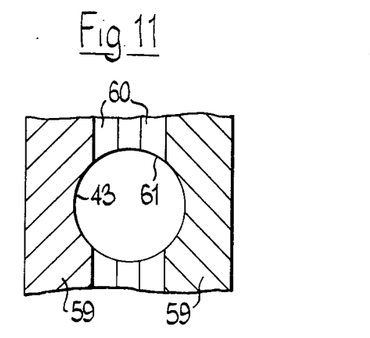
FIG. 11 is a front view similar to FIG. 8 showing part of the unit in larger detail.

At the second location 21, a removal device 62 (FIG. 1) is provided for removing containers from the conveyor. This removal device comprises a plurality of container inlet tubes 63 arranged with inlet ends in rows along and above the feed paths for containers on the conveyor. The tubes are staggered from row to row so that the arrangement and tube spacing is the same as that used for the article guides 42 as shown in FIG. 8. Containers from the conveyor are to be drawn into the tubes by suction for stacking purposes. Means are provided to cause the suction and this means comprises a plurality of air inlet pipes 64 in spaced-apart relationship around each tube, the pipes opening into each tube in an upwardly inclined manner as shown in FIG. 1. The inlet pipes of each tube are interconnected at their inlet ends by a common feed pipe 65 through which air under pressure is supplied. Because of the upward inclination of the pipes 64, air under pressure is forced upwardly of each tube 63 and this draws air from the bottom of each tube in the region of the carrying surface of the conveyor. As the containers are lightweight, these are drawn up into the tubes with the air and carried along the tubes by the stream of air for stacking purposes.

Figures 3, 4:
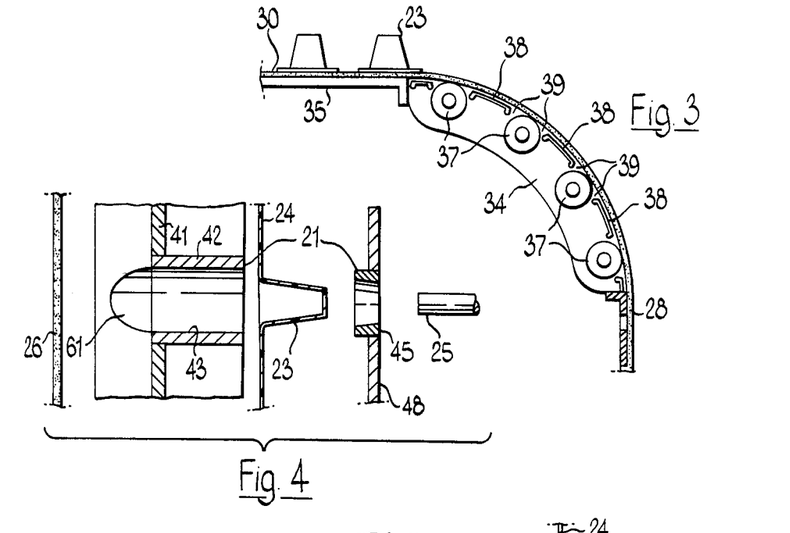
FIG. 3 is a view similar to FIG. 2 of another part of the apparatus.
FIGS. 4, 5 and 6 are cross-sectional views of a unit of the apparatus, showing different stages in its operation and on a larger scale than FIG. 1.
Figure 5:
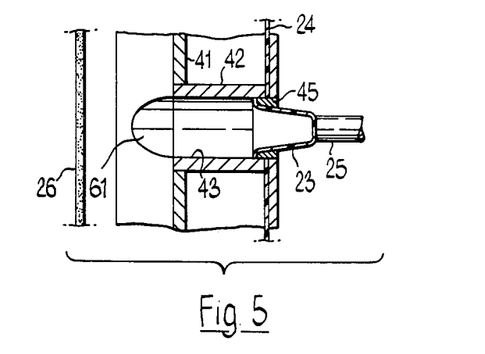

The compressed air is connected to the pipes 64, 65 intermittently and in synchronism with the operation of the unit so that suction is applied only whenever a group of containers has moved along the conveyor to occupy each of the positions beneath the tubes 63 as shown in FIG. 3.

To ensure that the containers are still upon their feed paths when they reach the removal device 62, guide plates 66 are provided between the feed paths on the approaches to and beneath the tubes 63. Also for the purpose of offering no resistance to movement of the containers up into the tubes 63, the side 35 of the box structure 32 is air impermeable in positions directly beneath the tubes so that the containers are not held to the conveyor carrying surface by suction in the second location 21.

To assist in absolute control of movement of containers from the first location and onto the conveyor, it is made possible with the above apparatus to vary the position of the conveyor and thus flight 28 relative to the unit 40. To this end, the box structure 32, conveyor and pulley wheels 31 are mounted upon a frame 67 having supporting wheels 68 mounted upon a guiding sub-frame 69 formed of U-shaped guide channels. Beneath the sub-frame is located a disposal unit or hopper 70 which extends outwardly from the main plate 41. This hopper is provided to catch any containers being moved from the article guides 42 by the ejector pins when the main frame 67 and conveyor have been moved away from the unit 40. Hence, the operation of the apparatus for method steps involved prior to application of containers to the conveyor may continue while the conveyor is removed from its operating position or is being located accurately in its best operating position.

Figures 12, 13:
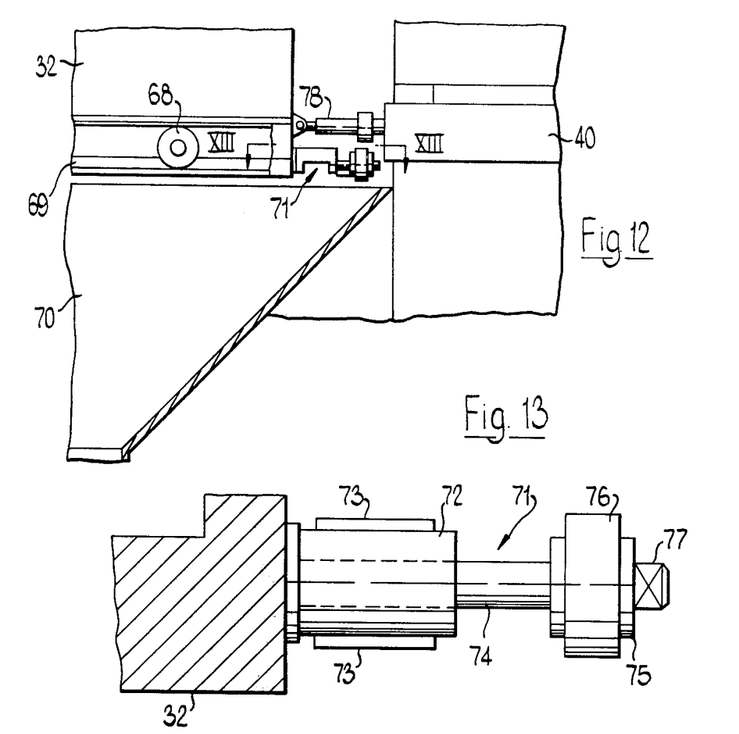
FIG. 12 is a partly diagrammatic side elevational view of the apparatus showing stop elements for accurately locating parts of the apparatus together.
FIG. 13 is a cross-sectional view along line 'XIII—XIII' in FIG. 12 and on a larger scale to show the stop elements.

Adjustable stop elements are provided which may be set in position to mark the location of the frame 67 for a desirable operating position of the conveyor whereby the conveyor may be removed upon the frame for any purpose and then returned to the desirable position without need for any adjustment or trial run of the apparatus to re-establish its position. These stop elements comprise two or more stop members 71 (FIGS. 12 and 13) each with a stop block 72 adjustably mounted upon sub-frame 69 by means of two lateral guide plates 73 secured to the sub-frame. The block 72 has a threaded axial passage carrying a threaded rod 74, head 75 of which is rotatably mounted in an abutment block 76 which abuts against the unit 40 when the frame 67 is moved towards the unit 40. A square end 77 of the rod 74 allows for turning of the rod in the block 72 to adjust the axial position of the abutment block 76. A piston and cylinder arrangement 78 disposed immediately above the stop elements moves the frame 67 along the sub-frame. Another stop 79 is provided at the other end of the sub-frame (FIG. 1) to prevent movement of the frame 67 off the sub-frame.

In use of the apparatus, the sheet 24 of thermoplastics material carrying the integral containers 23 is fed downwardly of the cutting edges 44 in the first location and the containers are separated from the sheet, are transferred to the conveyor carrying surface and are then moved along the conveyor to the second location 21 where they are removed for stacking, up tubes 63. Initially with the containers being severed and moved along the article guides 42 by the ejector pins, the position of the frame 67 is adjusted by the use of the stop members 71 which locates the conveyor in the optimum position for the size of containers being moved.

The containers 23 are disposed in the sheet 24 with the arrangement and spacing of the article guides and cutting tools shown by FIG. 8. With the severing device open as shown in FIG. 4, i.e. with the male cutting tools 45 and ejector pins removed from within the article guide 42, the sheet 24 is moved downwardly in intermittent manner to bring a plurality of containers 23 into accurate coaxial alignment with the cutting edges 44. In this position as shown by FIG. 4, the containers extend outwardly away from sheet 24 with their open rimmed ends facing through the annular cutting edges towards the carrying surface of the conveyor.

The severing device is then operated after the sheet becomes stationary, to move the mounting plate 48 with the male tools towards the female cutting edges simultaneously with a trailing movement of the box carrier 52 with the ejector pins which are axially withdrawn from the tool end surfaces 50 (FIG. 4). As the male tools advance on their cutting strokes, they pass axially along the side walls of the containers until the end surfaces 50 engage the rims of the containers and then the containers are severed at their rims by coaction of male and female cutting edges 44 and 46. Continued movement of the male tools in the same direction carries them in sliding contact with the walls of the guide passages 43 while the end surfaces 50 and the frusto-conical surfaces 49 engage the rims and tapered container side walls to move the containers partly through the guide passages while holding the containers in their same positions of orientation, i.e. coaxial with the passages.

Upon the male tools reaching the ends of their cutting strokes (FIG. 5), the box carrier continues movement in the same direction to cause the ejector pins to pass coaxially through the male tools and engage the closed end walls of the containers with the end faces 53. Reduced air pressure in the interior 56 of structure 52 causes a suction at the end faces 53 to hold containers against these faces. The ejector pins moving forward on their working strokes then carry the containers through the passages 43 as shown in FIGS. 1, 6 and 7. FIG. 1 is not representative of the true operation of the operational unit 40 as all of the ejector pins move both on their working and return strokes together as they are controlled by the structure 52. FIG. 1, however, does show the sequence of movement of the ejector pins 25 from the top pin position in which a container is beginning to emerge from a passage 43 to the third from top position which is at the end of the working stroke of an ejector pin. This position is also shown in FIG. 7. During movement into this position and beyond the main plate 41, the continuation of the passages afforded by the part cylindrical surfaces 61 of the stabilizing plates helps the ejector pins to hold the desired orientation of the containers.

Upon reaching the outermost positions of the ejector pins, the open rimmed ends of the containers are still a short distance from the carrying surface of the conveyor. The interior of the structure 52 is then connected to the compressed air supply which applies pressure at the end faces 53 to urge the containers away from the ejector pins and towards the carrying surface 27. Movement towards the carrying surface is assisted by the air being drawn through the conveyor and into the box 32. Upon reaching the carrying surface, the containers are retained thereagainst by the suction applied to the rimmed end which draws air from out of the containers. During movement of the containers across the gap between the main plate 41 and the carrying surface, and particularly when the containers are unsupported momentarily after being moved out of contact with the ejector pins and before engaging the moving carrying surface, the stabilizing plates 59 ensure that the containers do not wander unduly from their desired paths of orientation. Even with the containers held upon the carrying surface 27 and moving upwardly along their feed paths on the conveyor, the surfaces 60 of the plates are close to the containers to ensure their correct location on the feed paths.

As the containers are moved upwardly along the continuously moving conveyor, the conveyor moves a succeeding part of its carrying surface into horizontal alignment with the passages 43, and the ejector pins 25 and male tools 45 are returned to their positions of FIG. 4 to enable a succeeding portion of the sheet 24 to be lowered to bring succeeding containers 23 into alignment with the cutting tools for another operation for cutting and transfer of the containers.

The containers upon being taken up flight 28 of the conveyor, move around arcuate portion 29 and then onto horizontal flight 30 while being held on the carrying surface by suction. As the containers move beneath the tubes 63, no pressurized air is being fed up the pipes 64 and the suction within the tubes is hence not operating. Upon the containers having moved sufficiently forward, as shown in FIG. 1, in which they occupy all spaces beneath the tubes 63, the pressurized air is automatically switched on for a sufficient time to suck the containers up into the tubes and away for stacking purposes.

In a modification of the above embodiment (not shown), the ejector pins operate to apply the containers to the carrying surface sequentially. However, as the conveyor is moving upwardly, then the containers must be applied firstly by the top ejector pins followed by succeeding lower pins. This method of operation complicates the operation of the stripper mechanism unduly and also means adjusting the relative positions of tubes 63.

Figure 14:
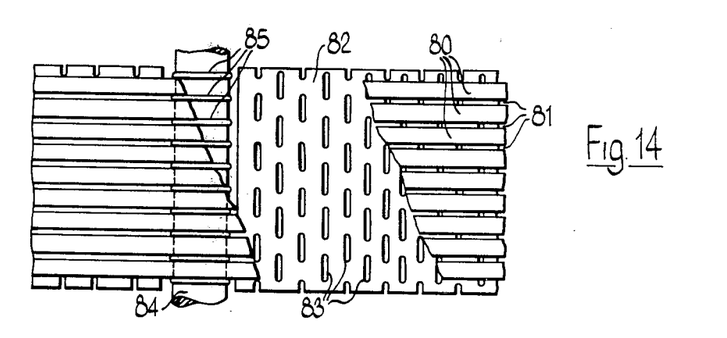
FIG. 14 is a plan view of part of a conveyor and supporting structure according to a modification of the embodiment.

In a further modification shown in FIG. 14, the conveyor 26 is replaced by a plurality of narrow side-by-side conveyor belts 80 which are not themselves air permeable and are spaced-apart to provide gaps 81 for the flow of air. FIG. 14 represents any part of the conveyor through which air is to be drawn into the box 32. As may be seen, the side 82 of the box which supports the conveyor belts is formed with rows of slots 83 of staggered and overlapping positioning. This ensures that the gaps 81 are aligned with some at least of the slots and that air is drawn through the gaps to hold the containers against the carrying surface. To maintain the spacing of the belts and hence the gaps 81, freely rotatable rollers 84 are disposed at intervals in recesses in the box side 82. These rollers have collars 85 which project above the surface of the side 82 and are located between adjacent belts 80 to hold them apart. The collars do not project above the carrying surface of the conveyor.

What is claimed is:

1. Apparatus for moving lightweight articles from a first location to a second location comprising:
   (a) an endless conveyor moveable continuously past the first location and towards and through the second location, and having an article carrying surface directed towards the first location and air flow passages from the article carrying surface to the side of the conveyor remote from the carrying surface;
   (b) air pressure reducing means disposed at said remote side of the conveyor and operable to draw air through the conveyor and hold articles against the carrying surface by suction effect as the conveyor moves towards the second location;

(c) at least one article ejector pin moveable on a working stroke through the first location normal to and towards the carrying surface to push successive articles on successive working strokes from the first location towards the carrying surface, and then moveable on a return stroke preparatory to a succeeding working stroke;

(d) movement of the pin on its working stroke being limited to define a gap between the conveyor and the pin sufficiently small to enable transfer of an article to the carrying surface with the distance across the gap being greater than the maximum dimension of the article in the direction of pin movement; and (e) article orientation control means operable between the first location and the carrying surface to hold an article in a desired position of orientation as it is pushed towards the carrying surface by the ejector pin.

2. Apparatus according to claim 1 wherein the orientation control means is operable to hold an article to the ejector pin during the working stroke and is operable to release the article at the end of the working stroke.

3. Apparatus according to claim 1 wherein the ejector pin comprises an annular end face for engaging a surface of an article during a working stroke and has passage defining means with an axially directed orifice disposed within the annular end face, said passage defining means comprising at least a part of the article orientation control means and being interconnectable with air pressure reducing means to reduce air pressure within the passage defining means and hold the article to the pin by suction during the working stroke.

4. Apparatus according to claim 3 wherein the passage defining means is connectable to a source of compressed air at the end of the working stroke to urge the article away from the ejector pin and towards the carrying surface, and a valve means is operationally controlled by the position of the ejector pin to connect the passage defining means alternately to the air pressure reducing means or the source of compressed air.

5. Apparatus according to any of claims 3 and 4 wherein the ejector pin has an internal wall extending from the orifice, said internal wall forming the passage defining means and defining a passage axially along the pin.

6. Apparatus according to claim 5 wherein the ejector pin is formed with at least one metering passage leading to the axial passage in a position along the pin axially spaced from the annular end face.

7. Apparatus according to claim 1 wherein the article orientation control means comprises an article guide extending from the first location towards the carrying surface and defining an article guide passage, and the ejector pin is moveable along the guide passage on its working and return strokes, the guide terminating at a position spaced from the carrying surface to avoid interference with articles as they are moved by the carrying surface along a feed path towards the second location.

8. Apparatus according to claim 7 wherein the article orientation control means additionally includes stabilizing plates extending from the article guide towards the carrying surface and extending one along each side of a feed path for articles held upon and being moved along by the carrying surface, said stabilizing plates having stabilizing surfaces facing across the feed path to guide articles along the feed path.

9. Apparatus according to claim 7 for moving articles in the form of tapered containers between the locations with larger diameter ends carried upon the carrying surface, wherein the stabilizing plates are tapered from the article guide towards the carrying surface and parts of their stabilizing surfaces in axial alignment with the guide passage are shaped to form axial extensions of the guide passage.

10. Apparatus according to claim 1 for moving articles in the form of containers between the locations and, in the first location, comprising a severing device including a pair of coacting cutting tools, one of said tools being a female cutting tool having an annular cutting edge and the other tool being a male cutting tool moveable on a cutting stroke towards the carrying surface and through the female cutting tool to sever containers at their rims from a material length with which they are integral, the male cutting tool being annular so as to move along and surround, on its cutting stroke, the side wall of a container located in the first location with its open end directed towards the carrying surface, and the severing device comprises a stripper plate which carries the ejector pin provided to engage the outside surface of a closed end of each severed container on its working stroke.

11. Apparatus according to claim 10 wherein the severing device is a multiple cutting tool having a plurality of pairs of coacting cutting tools and ejector pins associated one with each pair of cutting tools, the pairs of cutting tools being disposed spaced-apart side-by-side to form rectilinear rows with each row extending in the direction of movement of the conveyor and the rows spaced-apart laterally of said direction of movement.

12. Apparatus according to claim 11 wherein the pairs of tools are disposed in staggered relationship from one row to another.

13. Apparatus according to any of claims 11 and 12 provided with a plurality of guide plates extending in the direction of movement of the conveyor and lying between the carrying surface and the severing device and between rows of tools, the guide plates having side surfaces facing across feed paths of the conveyor to guide containers along the feed paths.

14. Apparatus according to claim 1 wherein the conveyor is permeable to flow of air.

15. Apparatus according to claim 1 wherein the conveyor comprises two or more side-by-side conveyor belts which define gaps between them, the gaps defining the passages for the flow of air.

16. Apparatus according to any of claims 14 and 15 wherein the air pressure reducing means comprises a box structure having perforate sides supporting the conveyor from the first to the second locations, the interior of the box structure being connectable to a source of reduced air pressure to draw air through the conveyor and the perforate sides into the box structure.

17. Apparatus according to claim 1 wherein the ejector pin has a length which is adjustable.

18. Apparatus according to claim 1 wherein means are provided for adjusting the distance between the conveyor and the first location.

19. Apparatus according to claim 18 wherein said adjusting means comprises a frame carrying the conveyor, and a guiding sub-frame upon which the frame is mounted for movement towards and away from the first location.

20. Apparatus according to claim 19 provided with adjustable stop elements to adjust the minimum distance between the conveyor and the first location.

21. Apparatus according to claim 20 wherein an article disposal unit is located beneath the conveyor to catch any articles moved towards the carrying surface and released by the ejector pin when the conveyor is spaced from a desirable operating position to prevent articles from reaching the carrying surface.

22. Apparatus for moving lightweight articles in the form of containers from a first location to a second location comprising:
(a) an endless conveyor moveable continuously past the first location, and having an article carrying surface directed towards the first location and air flow passages from the article carrying surface to the side of the conveyor remote from the carrying surface;
(b) air pressure reducing means disposed at said remote side of the conveyor and operable to draw air through the conveyor and hold containers against the carrying surface by suction effect as the conveyor moves towards the second location;
(c) a severing device disposed in the first location, said device comprising a pair of coacting cutting tools, one of said tools being a female cutting tool having an annular cutting edge and the other tool being a male cutting tool moveable on a cutting stroke towards the carrying surface and through the female cutting tool to sever containers at their rims from a length of material with which they are integral, the male cutting tool being annular so as to move along and surround the side wall of a container located in the first location as the male cutting tool moves towards the female cutting tool in its cutting stroke;
(d) an article guide extending from the female cutting tool towards the carrying surface and defining an article guide passage for guiding a container as it is moved from the first location to the carrying surface; and
(e) an article ejector pin moveable on a working stroke towards the carrying surface while trailing the male cutting tool moving on its working stroke, the ejector pin continuing its working stroke after the completion of the cutting stroke to pass through the annular male cutting tool and engage a surface of a closed end of a severed container and transfer the container to the carrying surface, the ejector pin then being moveable on a return stroke preparatory to a succeeding working stroke.

23. Apparatus according to claim 22 wherein the ejector pin comprises an annular end face to engage said surface of the container during a working stroke and also has a passage defining means with an axially directed orifice disposed within the annular end face, said passage defining means being interconnectable with air pressure reducing means to reduce air pressure within the passage defining means and hold the container to the pin by suction during the working stroke.

24. Apparatus according to claim 23 wherein the passage defining means is connectable to a source of compressed air at the end of the working stroke to urge the container away from the ejector pin and towards the carrying surface, and a valve means is operationally controlled by the position of the ejector pin to connect the passage defining means alternatively to the air pressure reducing means or the source of compressed air.

* * * * *